May 20, 1930.  W. STRICKER  1,758,984
APPARATUS FOR SPRAYING HEAVY OILS
Filed Aug. 7, 1928
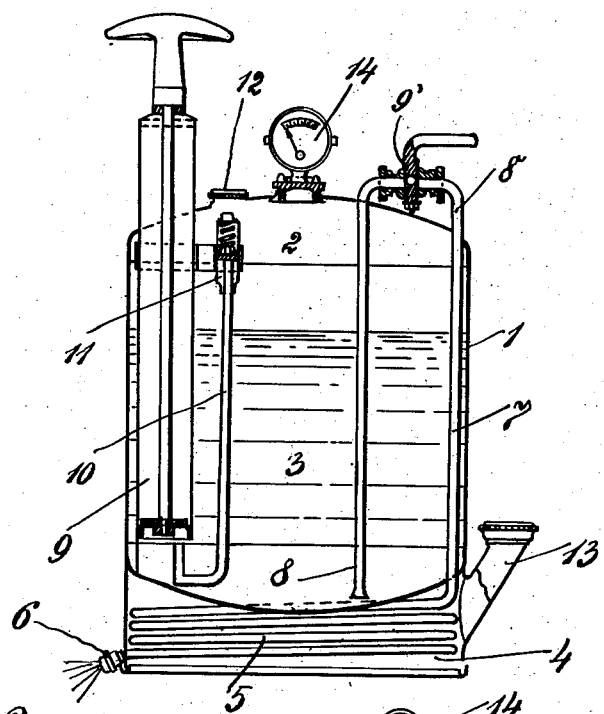
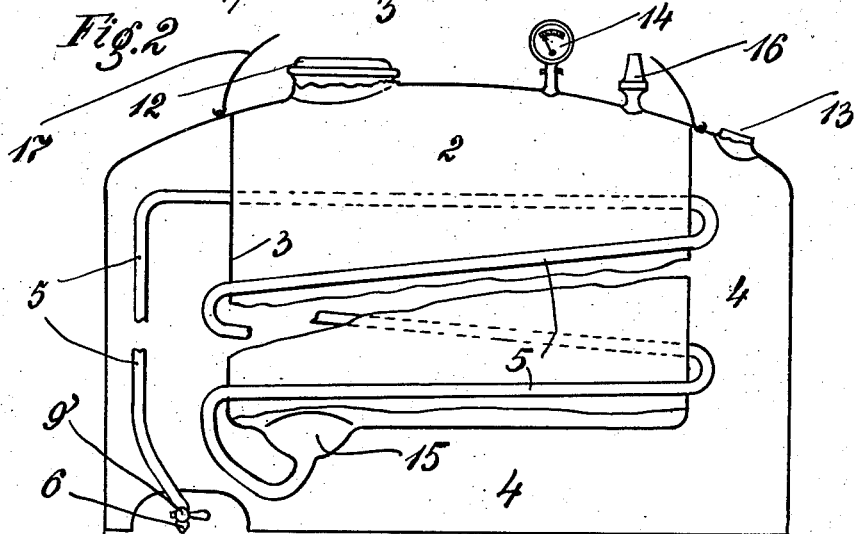

Patented May 20, 1930

1,758,984

UNITED STATES PATENT OFFICE

WILLY STRICKER, OF HANOVER, GERMANY, ASSIGNOR TO CURT RICHTER, OF HANOVER, GERMANY

APPARATUS FOR SPRAYING HEAVY OILS

Application filed August 7, 1928, Serial No. 298,090, and in Germany August 10, 1927.

The present invention has for its object an apparatus for spraying and spreading heavy oils or consistent fats. The novel feature resides in the fact that the device comprises a hot water receptacle with a heating pipe, whilst the chamber for the pressure agent lies above the fat or oil level, the pressure being produced by a pump or by introducing the pressure fluid from elsewhere.

On the drawing:

Fig. 1 is a side view, partly in section, of a stationary apparatus.

Fig. 2 is a similar view of a portable apparatus.

In both figures the same reference numerals designate identical parts. According to Figure 1, the receptacle 1 comprises the pressure chamber 2, the oil tank 3 and the heating chamber 4, which contains hot water or the like. Within the chamber 4 lies a spiral heating pipe 5 provided with a nozzle 6. The vertical part 7 continues by a return bend 8 having a cock 9' and enters finally into the oil chamber 3. The end of the pipe 8 lies near the concave bottom. Within the chambers 2, 3 is provided a pressure pump 9, the exhaust pipe 10 having an automatic check valve 11. 12 is an opening for the introduction of the oil or grease or the like and 13 a similar opening for the inlet of the heating agent (water or the like). 14 is a pressure gauge.

In use, the apparatus is filled with hot water which can be held at the necessary temperature by direct heating or an electric heater (not shown) so that the oil or grease is brought to a sufficient liquid state which permits its spreading or spraying by means of the nozzle 6 as soon as a sufficient pressure is produced in the chamber 2 by the acting of the pump 9 and opening of the cock 9'.

According to the Figure 2, the spiral pipe 5 is wound round the oil containing vessel 3 to which it is attached at 15. The vessel depends into the chamber 4. The pressure fluid is introduced by the inlet branch 16.

The function is selfunderstanding.

I claim:

Apparatus of the class described comprising a vessel having a chamber for the reception of hot water and a chamber for the reception of oil, a pipe coil leading from the oil chamber and arranged in the hot water chamber and provided with a discharge nozzle arranged near the bottom of the vessel and air compressing apparatus arranged in the said oil chamber to discharge compressed air thereinto and having an operating handle arranged exteriorly of and above said vessel.

WILLY STRICKER.